Aug. 7, 1945.  M. MALLORY  2,381,612
IGNITION TIMING CONTROL MEANS FOR INTERNAL-COMBUSTION ENGINES
Filed Nov. 10, 1944
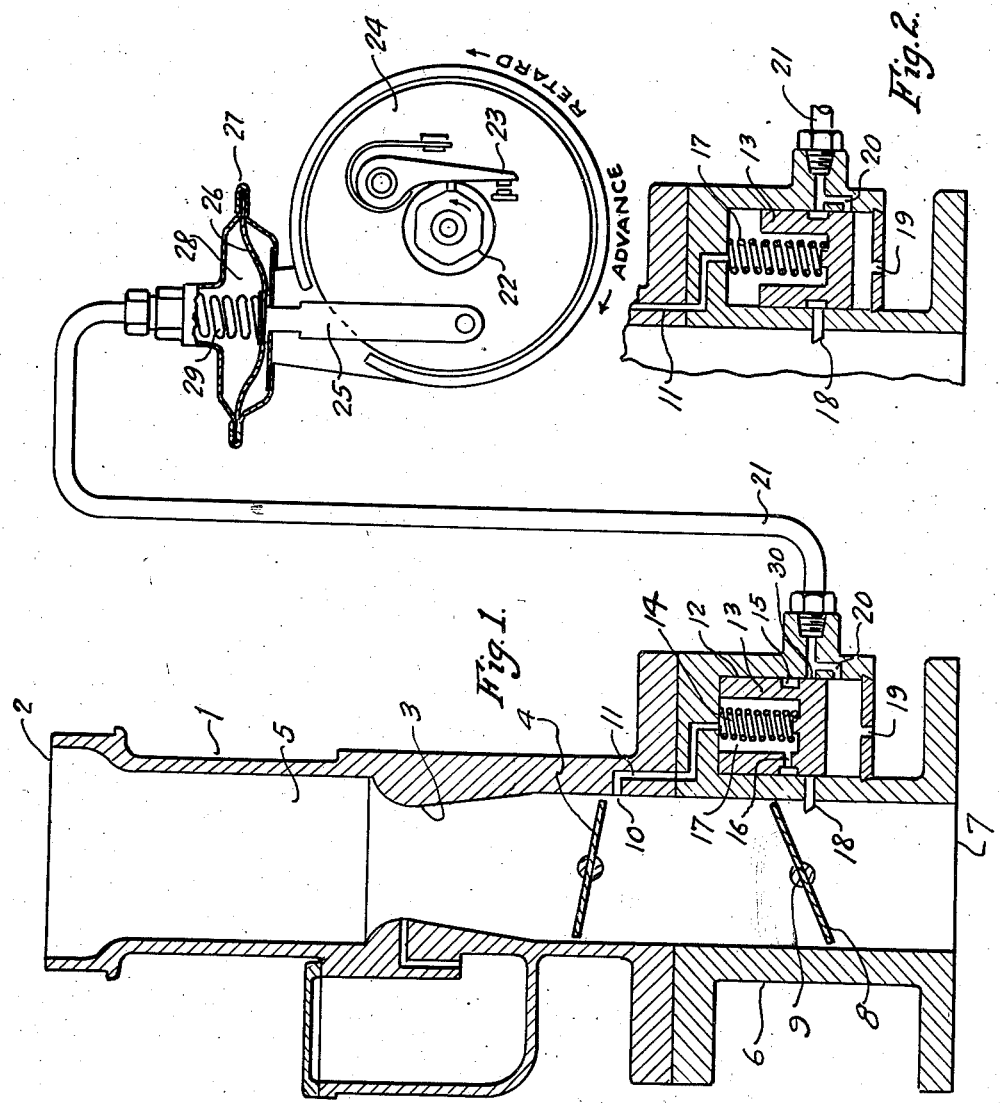
INVENTOR.
Marion Mallory
BY Barnes, Kisselle, Laughlin & Raisch
Attorneys Patented Aug. 7, 1945

2,381,612

UNITED STATES PATENT OFFICE 2,381,612

IGNITION TIMING CONTROL MEANS FOR INTERNAL-COMBUSTION ENGINES

Marion Mallory, Detroit, Mich.

Application November 10, 1944, Serial No. 562,782

9 Claims. (Cl. 123—117)

This invention relates to ignition timing control means for internal combustion engines.

It is old in the art to control the ignition timing of an internal combustion engine by ignition timing control means which is actuated by the pressures obtaining in the engine intake passageway, see my prior Patent 2,268,490. However, where an engine speed governor is sandwiched between the carburetor and the intake manifold, a pressure ignition system similar to that shown in my patent cannot be used because there will be no spark advance when the engine speed governor valve moves toward closed position. In my prior patent I connect the suction device, which actuates the ignition timer, into the carburetor venturi and into the intake passageway adjacent to, and on the atmosphere side of, the throttle valve. When an engine speed governor is sandwiched between the carburetor and the intake passageway and the governor valve is partly closed and the main throttle valve is wide open, there will be very little suction in the venturi or in the intake passageway adjacent to the main throttle valve and therefore the pressure controlled ignition timer will be retarded. The sandwiching of the speed governor between the carburetor and the engine therefore prevents the obtaining of the proper ignition curve or timing.

It is the object of this invention to produce an ignition timing control means which is actuated by the intake passageway pressure to obtain proper ignition timing when an engine speed governor is sandwiched between the governor and the engine.

My pressure timing control means for an internal combustion engine is useful both when the full load and part load timing is controlled by the intake passageway pressure and also when the timing is partly mechanically controlled and partly controlled by the intake passageway pressures, such, for example, where the full load ignition timing curve is obtained by means of a centrifugal governor and supplementary or part load timing is obtained by utilization of the intake manifold pressures.

Fig. 1 is a cross section partly in elevation showing my pressure ignition timing control means for an internal combustion engine.

Fig. 2 is a detail showing a modified form of the invention.

The various parts illustrated in the drawing are numbered for reference as follows: carburetor 1, air inlet 2, carburetor venturi 3, manually controlled throttle valve 4 in the intake passageway 5, governor housing 6, outlet 7 to the engine, governor butterfly throttle valve 8 mounted on shaft 9 journaled in the governor housing 7, orifice 10 on the engine side of throttle valve 4 when closed for idle, passageway 11 between orifice 10 and cylinder 12, valve 13 reciprocable in cylinder 12, compression spring 14, circumferential channel 15 in the wall of valve 13, passageway 16 in wall of valve 13 connecting channel 15 with chamber 17 within valve 13. Orifice 18 connecting cylinder 12 with the intake passageway (orifice 18 being positioned in line with the governor throttle shaft 9), air bleed orifice 19 connecting cylinder 12 with atmosphere, passageway 20 connecting conduit 21 with atmosphere through port 19 when valve 13 is raised.

The timing mechanism is conventional and consists of rotatable cam 22 which operates the electrical circuit breaker 23 mounted on plate 24 which can be rotated clockwise to advance and counterclockwise to retard the spark, connecting rod 25 connecting plate 24 with the flexible diaphragm 26 of the suction device 27, suction chamber 28 communicating with conduit 21 and compression spring 29 tending to bias plate 24 toward retarded position.

The operation of my device is as follows: It should be borne in mind that governor throttle valve 8 can be controlled in any conventional manner, for example, it can be a velocity type governor valve, or it can be controlled by the engine intake passageway pressures, or mechanically controlled by a centrifugal governor.

Assuming the engine is idling, as illustrated in Fig. 1, then orifice 10 is located between throttle valve 4 and the engine. The vacuum on the engine side of throttle valve 4 acts through orifice 10, passageway 11 to raise valve 13 against compression spring 14 and thereby holds channel 15 out of registration with orifices 18 and 30. At this time valve 13 clears passageway 20 so that atmosphere will be bled through port 19, passageway 20 and conduit 21 to chamber 28 thereby causing spring 29 to move timer plate 24 to retarded position. If throttle 4 is moved towards an open position, the suction at orifice 10 will drop in channel 11 and the spring 14 will force valve 13 downwardly to the position illustrated in Fig. 2, thereby causing channel 15 to register with orifices 18 and 30 and valve 13 will now close passageway 20. The air bleed will now be shut off and orifice 18 will now be in communication with suction chamber 28.

Since orifice 18 is located in line with the governor throttle shaft 9, I have found that the governor shaft restriction speeds up the velocity by orifice 18, similar to a venturi, and creates as much suction or vacuum at orifice 18 as though orifice 18 were located in the carburetor venturi. Therefore, I utilize the suction created by the velocity of the motive fluid flowing by orifice 18 to actuate suction device 27 and thereby produce the wide open or full load spark timing curve. Orifice 18, if desired, can be quilled. If the engine reaches its governed speed and governor valve 8 starts towards closed position, the vacuum will rise at orifice 18 which will give more spark advance when the governor throttle is controlling the speed of the engine than when it is wide open. However, at this time when channel 15 registers with orifice 18, orifice 18 and orifice 10 are connected together by passageway 11, chamber 17, orifice 16 and channel 15 so as to blend down the high manifold vacuum to prevent too much spark advance. When valve 8 moves toward closed position and channel 15 is in communication with orifice 18, orifice 10 plays the role of an air bleed to orifice 18 and as governor valve 8 moves toward open position orifice 10 ceases to be an air bleed and becomes a suction orifice. When carburetor throttle 4 is moved away from idle position valve 13 moves downwardly to bring channel 15 into communication with orifice 18 and thereby place orifice 18 in communication with the suction device and also in communication with orifice 10. The valve 13 remains down at all times except when the carburetor throttle 4 is in idle or nearly idle position.

The modification shown in Fig. 2 is identical in all respects with the ignition timing control system shown in Fig. 1, except that orifice 16 is omitted so that orifices 18 and 10 are never placed in communication with each other. The form of invention shown in Fig. 2 is particularly useful with an ignition system having both a mechanical governor and supplementary vacuum actuated means for advancing and retarding the spark.

The operation of valve 13, insofar as movement is concerned, in the form shown in Fig. 2, is the same as above described. When throttle valve 4 is in idle position the vacuum at orifice 10 raises piston 13 and shuts off communication between orifice 18 and the suction device 27 which is bled to atmosphere through passageway 20. When throttle valve 4 opens, orifice 10 is placed in atmosphere and spring 17 lowers valve 13 to place orifice 18 in communication with the suction device and closes off air bleed 20 so that the advancing or retarding of the spark will be governed by the pressure conditions obtaining at orifice 18. Assuming throttle valve 4 is open with piston 13 lowered and the governor valve 8 open, the spark will be advanced in accordance with the engine speed or the centrifugal ignition governor. Under such conditions as the engine reaches its governed speed and valve 8 moves toward closed position, the vacuum at orifice 18 will increase and further advance the spark in addition to the advance by the centrifugal ignition governor.

I claim:

1. In an internal combustion engine, in combination an intake passageway for said engine, a manual throttle valve therein, an automatic governor throttle valve in the intake passageway on the engine side of the manual throttle valve, an ignition device for said engine, vacuum operated means for adjusting said ignition device to control the time of sparking, an orifice in the intake passageway adjacent to and on the engine side of said manual throttle valve when in idle position and passing on to the atmosphere side of the manual throttle valve during the initial opening movement of said valve, a second orifice in the intake passageway adjacent the governor valve and on the engine side of the governor valve when in idle position, a conduit connecting said second orifice with the vacuum operated means, and valve means for controlling communication between said second orifice and the vacuum operated means, said valve means being controlled by the pressure conditions obtaining at the first mentioned orifice, said valve means responding to the vacuum on the engine side of the manual throttle valve when substantially in idle position to close off communication between the second orifice and the vacuum operated means.

2. In an internal combustion engine, in combination an intake passageway for said engine, a manual throttle valve therein, an automatic governor throttle valve in the intake passageway on the engine side of the manual throttle valve, an ignition device for said engine, vacuum operated means for adjusting said ignition device to control the time of sparking, an orifice in the intake passageway adjacent to and on the engine side of said manual throttle valve when in idle position and passing on to the atmosphere side of the manual throttle valve during the initial opening movement of said valve, a second orifice in the intake passageway adjacent the governor valve and on the engine side of the governor valve when in idle position, a conduit connecting said second orifice with the vacuum operated means, and valve means for controlling communication between said second orifice and the vacuum operated means, said valve means being controlled by the pressure conditions obtaining at the first mentioned orifice, said valve means responding to the vacuum on the engine side of the manual throttle valve when substantially in idle position to close off communication between the second orifice and the vacuum operated means, and an air bleed controlled by said valve means and arranged to bleed said vacuum operated means whenever the valve means closes off communication between the second orifice and the vacuum operated means.

3. In an internal combustion engine, in combination an intake passageway for said engine, a manual throttle valve therein, an automatic governor throttle valve in the intake passageway on the engine side of the manual throttle valve, an ignition device for said engine, vacuum operated means for adjusting said ignition device to control the time of sparking, an orifice in the intake passageway adjacent to and on the engine side of said manual throttle valve when in idle position and passing on to the atmosphere side of the manual throttle valve during the initial opening movement of said valve, a second orifice in the intake passageway adjacent the governor valve and on the engine side of the governor valve when in idle position, means in said intake passageway for increasing the velocity of the motive fluid flowing by said second orifice, a conduit connecting said second orifice with the vacuum operated means, and valve means for controlling communication between said second orifice and the vacuum operated means, said valve means being controlled by the pressure conditions obtaining at the first mentioned orifice, said valve means responding to the vacuum on the engine side of the manual throttle valve when substantially in idle position to close off communication between the second orifice and the vacuum operated means.

4. In an internal combustion engine, in combination an intake passageway for said engine, a manual throttle valve therein, an automatic governor throttle valve in the intake passageway on the engine side of the manual throttle valve, a shaft upon which said governor throttle valve is mounted, an ignition device for said engine, vacuum operated means for adjusting said ignition device to control the time of sparking, an orifice in the intake passageway adjacent to and on the engine side of said manual throttle valve when in idle position and passing on to the atmosphere side of the manual throttle valve during the initial opening movement of said valve, a second orifice in the intake passageway adjacent the governor valve and on the engine side of the governor valve when in idle position, a conduit connecting said second orifice with the vacuum operated means, said second orifice being located in line with the governor throttle shaft which cooperates with the wall of the intake passageway to produce a Venturi effect upon the motive fluid flowing by said second orifice, and valve means for controlling communication between said second orifice and the vacuum operated means, said valve means being controlled by the pressure conditions obtaining at the first mentioned orifice, said valve means responding to the vacuum on the engine side of the manual throttle valve when substantially in idle position to close off communication between the second orifice and the vacuum operated means.

5. In an internal combustion engine, in combination an intake passageway for said engine, a manual throttle valve therein, an automatic governor throttle valve in the intake passageway on the engine side of the manual throttle valve, an ignition device for said engine, vacuum operated means for adjusting said ignition device to control the time of sparking, an orifice in the intake passageway adjacent to and on the engine side of said manual throttle valve when in idle position and passing on to the atmosphere side of the manual throttle valve during the initial opening movement of said valve, a second orifice in the intake passageway adjacent the governor valve and on the engine side of the governor valve when in idle position, a conduit connecting said second orifice with the vacuum operated means, and valve means for controlling communication between said second orifice and the vacuum operated means and between said second orifice and the first orifice, said valve means being controlled by the pressure conditions obtaining at the first mentioned orifice, said valve means responding to the vacuum on the engine side of the manual throttle valve when substantially in idle position to close off communication between the second orifice and the vacuum operated means and the first orifice, said valve means responding to a rise in pressure when the throttle valve is open to place the second orifice in communication with both the first orifice and the suction device.

6. In an internal combustion engine, in combination an intake passageway for said engine, a manual throttle valve therein, an automatic governor throttle valve in the intake passageway on the engine side of the manual throttle valve, an ignition device for said engine, vacuum operated means for adjusting said ignition device to control the time of sparking, an orifice in the intake passageway adjacent to and on the engine side of said manual throttle valve when in idle position and passing on to the atmosphere side of the manual throttle valve during the initial opening movement of said valve, a second orifice in the intake passageway adjacent the governor valve and on the engine side of the governor valve when in idle position, a conduit connecting said second orifice with the vacuum operated means, and a piston valve for controlling communication between said second orifice and the vacuum operated means, said piston valve being controlled by the pressure conditions obtaining at the first mentioned orifice, said piston valve responding to the vacuum on the engine side of the manual throttle valve when substantially in idle position to close off communication between the second orifice and the vacuum operated means.

7. In an internal combustion engine, in combination an intake passageway for said engine, a manual throttle valve therein, an automatic governor throttle valve in the intake passageway on the engine side of the manual throttle valve, an ignition device for said engine, vacuum operated means for adjusting said ignition device to control the time of sparking, an orifice in the intake passageway adjacent to and on the engine side of said manual throttle valve when in idle position and passing on to the atmosphere side of the manual throttle valve during the initial opening movement of said valve, a second orifice in the intake passageway adjacent the governor valve and on the engine side of the governor valve when in idle position, a cylinder in communication with said first and second orifices, a conduit connecting said cylinder with the vacuum operated means, a piston valve in said cylinder for controlling communication between the second orifice and the conduit leading to the vacuum operated means, said piston valve being controlled by the pressure conditions obtaining at the first mentioned orifice and responding to the vacuum on the engine side of the manual throttle valve when in substantially idle position to close off communication between the second orifice and the vacuum operated means.

8. In an internal combustion engine, in combination an intake passageway for said engine, a manual throttle valve therein, an automatic governor throttle valve in the intake passageway on the engine side of the manual throttle valve, an ignition device for said engine, vacuum operated means for adjusting said ignition device to control the time of sparking, an orifice in the intake passageway adjacent to and on the engine side of said manual throttle valve when in idle position and passing on to the atmosphere side of the manual throttle valve during the initial opening movement of said valve, a second orifice in the intake passageway adjacent the governor valve and on the engine side of the governor valve when in idle position, a cylinder communicating with said first and second orifices, a piston valve in said cylinder having a circumferential groove therein, a conduit connecting said cylinder with said vacuum operated means, said piston valve being controlled by the pressure conditions obtaining at the first orifice and responding to the vacuum on the engine side of the manual throttle valve when substantially in idle position to close off communication between the second orifice and the said conduit, said piston valve responding to a rise in pressure at the first orifice when the manual throttle valve is open to place the circumferential groove in communication with the second orifice and the conduit to thereby subject the vacuum operated means to the pressure conditions obtaining at the second orifice.

9. The combination as set forth in claim 8 including an air bleed orifice controlled by said piston valve for bleeding down the vacuum in the vacuum operated means whenever the piston valve closes off communication between the second orifice and the vacuum operated means.

MARION MALLORY.